United States Patent [19]

Klotz et al.

[11] 4,205,436
[45] Jun. 3, 1980

[54] DEVICE FOR LOADING FILM CASSETTES

[75] Inventors: Artur Klotz; Helmut Lehmann, both of Leverkusen, Fed. Rep. of Germany

[73] Assignee: AGFA-Gevaert Aktiengesellschaft, Leverkusen, Fed. Rep. of Germany

[21] Appl. No.: 899,322

[22] Filed: Apr. 24, 1978

[30] Foreign Application Priority Data

Apr. 28, 1977 [DE] Fed. Rep. of Germany ....... 2718924

[51] Int. Cl.² ...................... B23P 19/00; B23P 21/00; B23Q 7/10
[52] U.S. Cl. ........................................ 29/783; 29/791; 29/806; 29/809
[58] Field of Search ................. 29/430, 742, 743, 759, 29/760, 771, 773, 783, 791, 806, 809

[56] References Cited

U.S. PATENT DOCUMENTS

| 3,457,627 | 7/1969 | Napor et al. | 29/430 |
| 3,499,202 | 3/1970 | Napor et al. | 29/806 X |
| 3,717,923 | 2/1973 | Arai et al. | 29/806 X |
| 3,742,586 | 7/1973 | Butler et al. | 29/430 |
| 3,930,296 | 1/1976 | Hoover | 29/430 |
| 4,035,899 | 7/1977 | Matsuda | 29/773 |
| 4,114,252 | 9/1978 | Kon et al. | 29/806 X |
| 4,127,925 | 12/1978 | Gaiser et al. | 29/430 |

Primary Examiner—Ervin M. Combs
Attorney, Agent, or Firm—Connolly and Hutz

[57] ABSTRACT

The invention relates to a device for loading film cassettes, in particular Super 8 Cassettes, with a film and a spool at the end thereof, wherein the loading device comprises means for conforming the said loop of film in shape to the shape of the narrow passages, and means for pushing the film so conformed sideways into the cassette.

2 Claims, 12 Drawing Figures

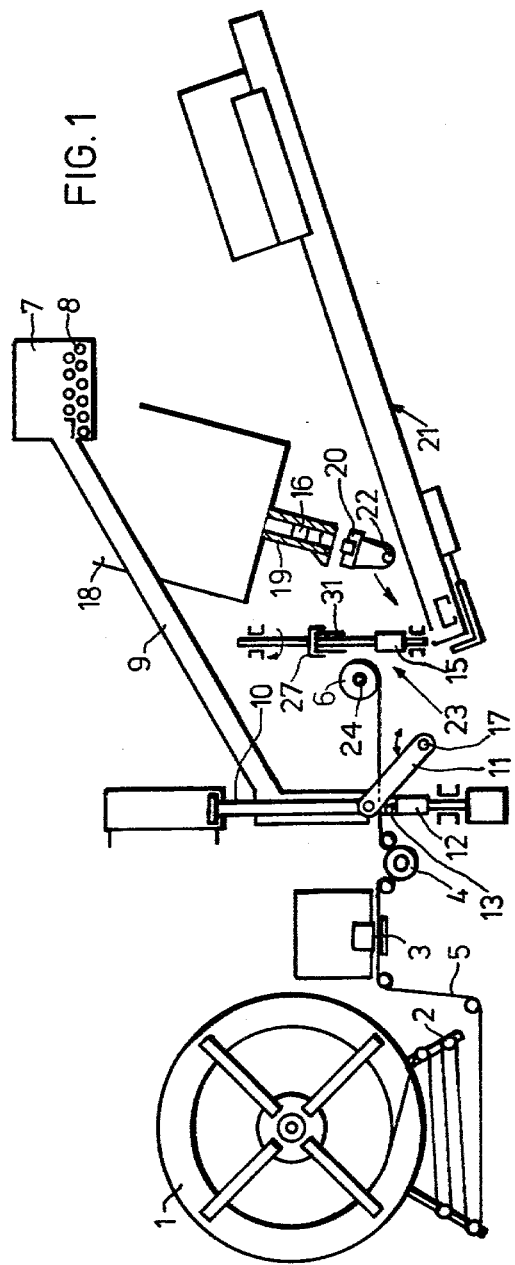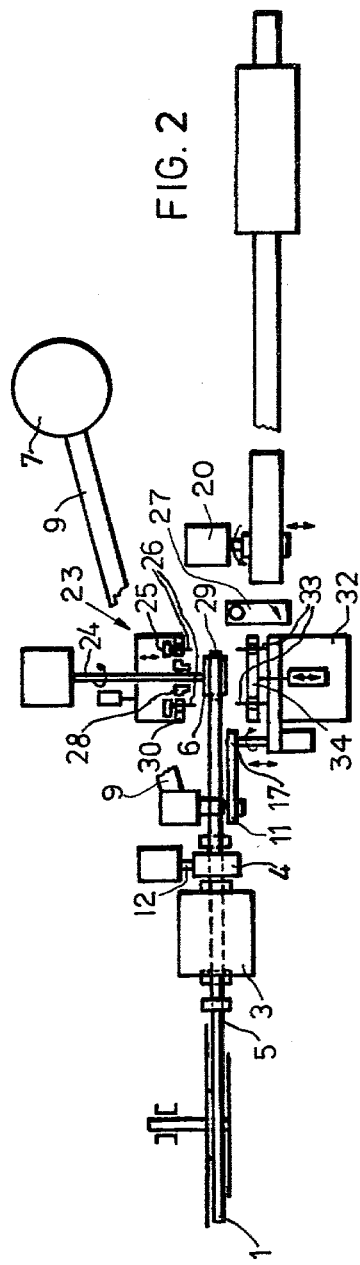

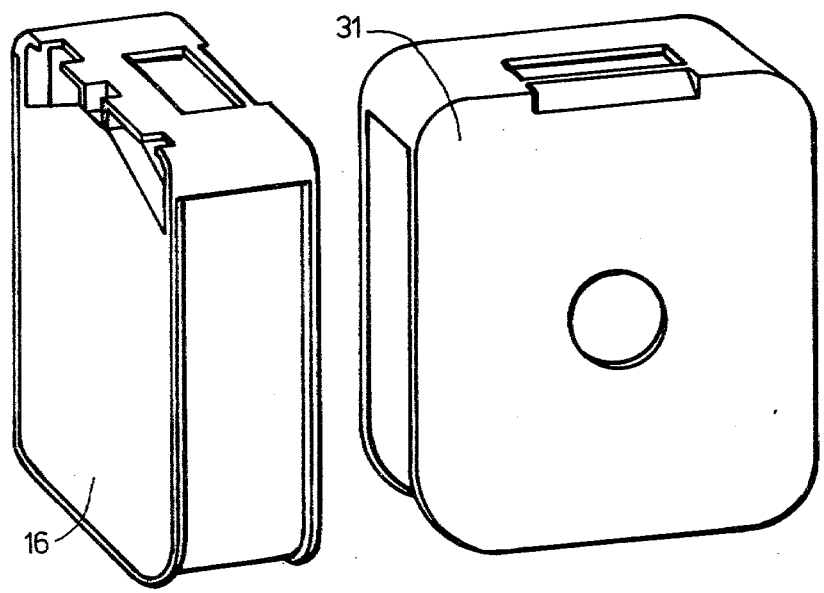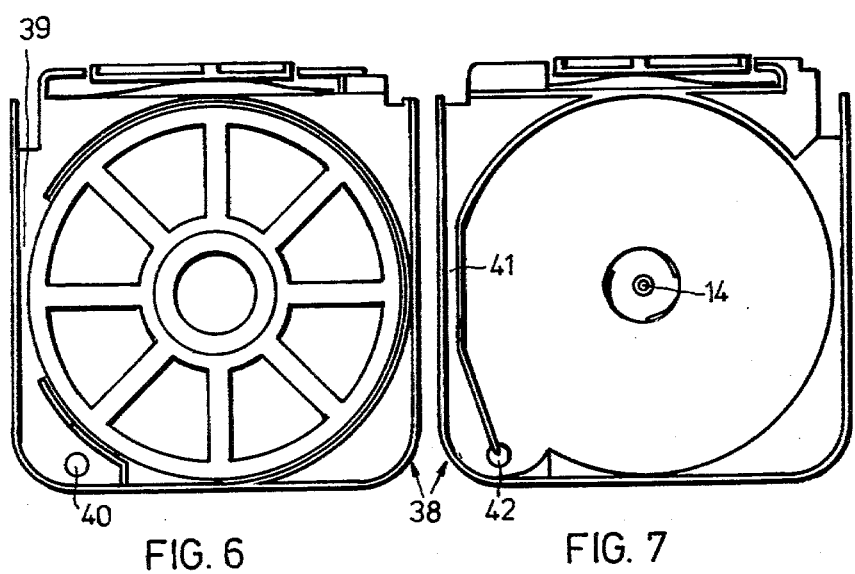

DEVICE FOR LOADING FILM CASSETTES

The invention relates to a device for loading film cassettes, in particular Super 8 Cassettes, with a film which consists of a spool-less roll thereof, a film loop which passes via passages and an exposure position, and a spool at the end thereof offset by at least a film width and arranged on the same spindle as the roll, the device comprising a feed roll for supplying a length of film a mechanism for measuring the length of film drawn off, a winding unit with an automatic winding means for producing a spool-less roll of film, a spool unit for applying a spool taken from a magazine to the outer free end of the roll, a magazine for making empty cassettes available, a loading device for loading the cassette with a complete film and a stacking unit for full cassettes.

In the past, a strip of film was drawn from the feed roller, then wound on to an automatic winding machine, cut into lengths and its free end provided with a spool. This film was inserted into the cassette manually. For this purpose, the cassette body was manually removed from the cassette casing and then placed on a table with the side having the spool take-up pin facing downwards. The roll of film was inserted from above and the free end of the strip of film threaded into the passage which was accessible from this side. The cassette body was then covered with a disc and turned round in unison therewith. The end of the strip of film was subsequently threaded into the passage on the other side of the cassette which was now accessible, and the spool was placed on the take-up pin. After tensioning the strip of film by rotating the spool and by subsequently turning the disc backwards, the cassette body was inserted into the cassette casing from the side.

When dealing with large quantities, as is the case for example with Super-8 films, manual operation is not economically feasible since a considerable amount of time is required to load the cassette which is of complicated shape. In addition to difficulties of having to load the cassette from two sides, great skill is required to insert the film into the passages, owing to the springiness of the material to be inserted and the small dimensions of the cassette. It is easy to make errors since the work is carried out in darkness. It is hardly feasible to check the underside of each cassette. Futhermore, errors are particularly underirable owing to the high value of the film material, especially since they are often only observed by the customer and thus lead to annoying complaints.

The object of the invention is to provide a device for automatically loading cassettes, in particular Super-8 Cassettes supplied from a magazine, with a cut-off length of film strip coming from a feed roll of film and formed into a roll of film the free end of the roll being provided with a spool. According to the invention there is provided a device for loading film cassettes with a film which consists of a spool-less roll thereof, and a film loop which passes via passages and exposure station, and a spool at the end thereof offset by at least one film width and arranged on the same spindle as the said roll, the device comprising a feed roll for supplying a length of film, a mechanism for measuring the length of film drawn off, a winding unit with an automatic winding means for producing a spool-less roll of film, a spool unit for applying a spool taken from a magazine to the outer free end of the roll, a magazine for making empty cassettes available, a loading device for loading the cassettes with a complete film and a stacking unit for full cassettes, wherein the loading device comprises means for causing the said loop of film to conform in shape to the shape of the said passages, and means for pushing the film so conformed sideways into the cassette.

The invention further provides a loading device for loading the cassettes with a complete film, wherein the loading device comprises (a) a winding reel which is adapted to be coupled during formation of the last turns to a horizontally mounted spindle and which is rotatable by a maximum of one rotation at any time, on which winding reel corresponding guide elements are arranged for causing the shape of the strip of film to conform to that of the passage of the cassette on the side of the roll;

(b) a positioning means which is moveable in front of the spindle and is provided for receiving the cassette fixed in an upright position and is equipped with a hood which may be raised for removing the cassette casing;

(c) a slide which is slidable against the positioning means upon which guide elements are arranged for causing the shape of the strip of film to conform to that of the passage on the take-up side;

(d) an axially and tangentially moveable lever having at its end a holder for a spool joined to the strip of film, which spool is movable from the take-up plane until the spool is delivered on to a take-up pin of the cassette loop in the guide elements on the base plate; and (e) a central pushing member provided with a bevel at its top for pushing the roll of film from the spindle bit by bit, and pushers along the guide elements for inserting the strip of film into the passages.

The advantages of the invention are that, by using this device, the film can be inserted safely into a cassette in a three-dimensional uninterrupted process despite the springiness of the material. The rotating winding reel prevents the strip of film from being subjected to unnecessary strain. This also applies to the process of winding the strip of film in the specified sequence of the guide elements before inserting the spool. Also, very little relative movement occurs between the strip of film and the guide elements, and this helps to avoid damage to the surface of the film being thus protected. When inserting the cassette casing, one of the arms slides along the upper bevel of the central pushing member towards the cassette body, without damaging the roll of film. During the pushing process, the strip of film is held tightly along the path of the guide elements by means of the spindle which is locked until just before the end.

All of these features lead to a reliable device which has many economic advantages. It avoids wastage of the expensive film in the factory and also avoids rejection by the customer which would result in the associated damage to the reputation of the maker of film.

In a particular embodiment, the guide elements are in the form of rollers. The danger of the sensitive surface of the film being scratched is reduced by the use of rotating rollers.

In another embodiment, the lower guide element is provided with a spring which acts as a protective trailer when the base plate is moved out. The restoring forces of the strip of film tend to pull the film from the lower guide element when the slide is moved away before the cassette casing closes the cassette body, and this is prevented by this simple means.

An embodiment of the invention is described in more detail below with reference to the accompanying drawings, in which:

FIG. 1 is a front elevational view of the loading machine of this invention;

FIG. 2 is a top plan view of the loading machine shown in FIG. 1;

FIG. 4 is a pictorial view of a cassette;

FIG. 5 is a pictorial view of a cassette casing;

FIG. 6 is an elevational view of a cassette body, viewed from the side where the roll of film is located;

FIG. 7 is an elevational view of a cassette body, viewed from the side where the spool is located;

FIGS. 1 and 2 show film cassettes being loaded with rolls of film, the free ends of which are provided with a spool.

Figure 3:
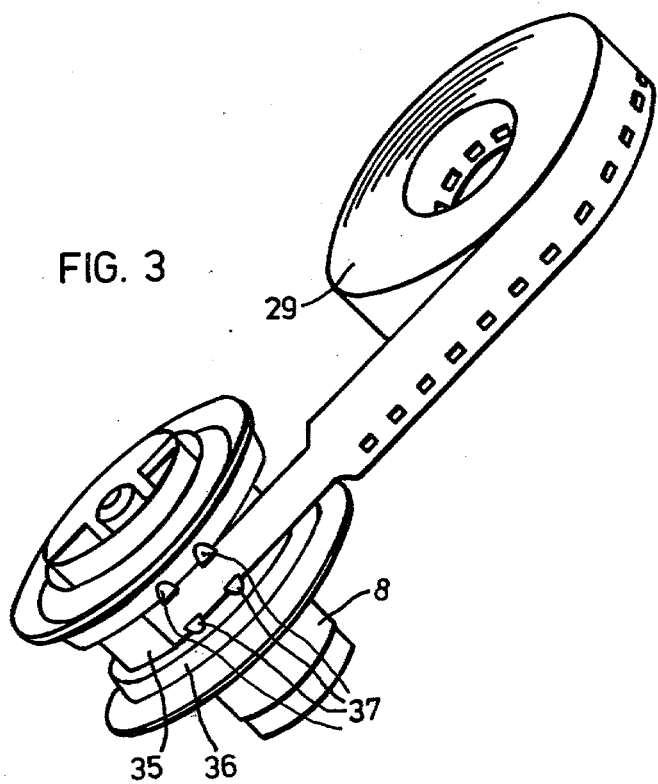
FIG. 3 is a pictorial view of a roll of film and spool.

A film drive 4 for supplying the beginning of a strip of film 5 to an automatic winding unit 6 is arranged downstream of a punching device 3 which itself is downstream of a feed spool 1 provided with a length compensator 2.

A film spool magazine 9 with separator 10 is located above the preceding components, downstream of a vibratory machine 7 for sorting spools 8, and conveys the spools 8 on to a spool applicator 12 which includes a film cutter 13 and a lever 11 which is pivotal about axle 17 and axially movable. The lever 11 is operable to take up a spool 8 and convey it on to a take-up pin 14 of a cassette 16 held in a positioning means 15.

A magazine 19 from which cassettes are separated by a cassette holder 20 is arranged beneath a container 18 supplying empty cassettes 16. The cassette holder 20 is mounted for rotation about a shaft 22 to supply empty cassettes 16 to the positioning means 15 and carry loaded cassettes off to a stacking unit 21.

A loading device 23 positioned around a spindle 24 comprises a winding shaft 25 which may be coupled to the spindle 24 and has centering guide elements 26 for the film and cassette, a central pushing member 28 arranged round the spindle for pushing a roll of film 29 and a pusher 30 for inserting the strip of film 5 along guide elements 26.

The positioning means 15 may be rotated against the spindle 24 and is provided with a hood 27 for removing the cassette casing 31.

A slide 32 with guide and centering elements 33 is movable in front of the positioning means 15 and has a pusher 34 for inserting the strip of film 5 along the guide elements 33 and a recess for the lever 11 for inserting the spool 8.

FIG. 3 shows a roll of Super-8 film 29, the free narrow end of which is fixed in a groove 35 in a core 36 of a spool 8 by means of four plastics pegs 37.

FIG. 4 shows the complete cassette 16.

FIG. 5 shows the cassette casing 31.

FIGS. 6 and 7 show the cassette body 38 respectively from the take-off side, to show a passage 39 and a guide roller 40, and from the take-up side, to show a passage 41, a guide pin 42 and the take-up pin 14.

Figure 8:
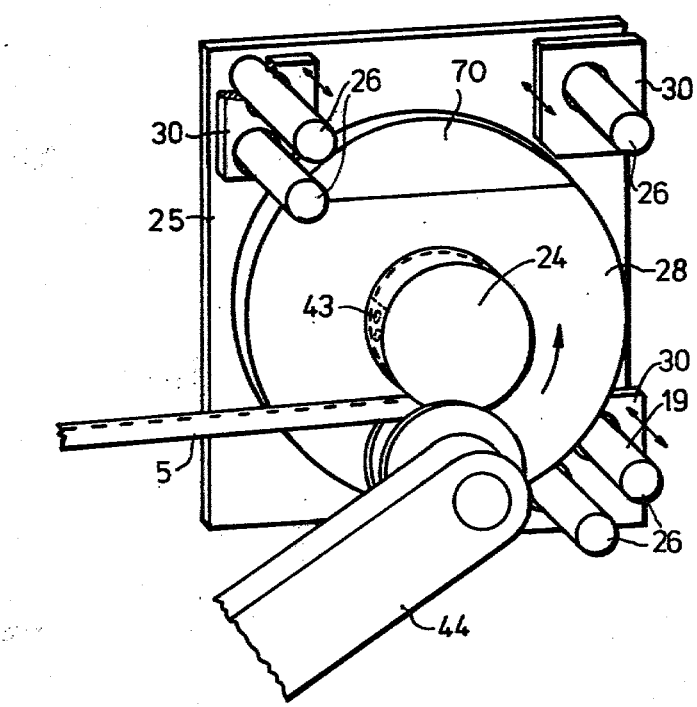
FIG. 8 is a pictorial view of a winding means.

FIG. 8 shows the spindle 24 with vacuum bores 43 and a film guide 44, the guide elements 26 being in the starting position.

Figure 9:
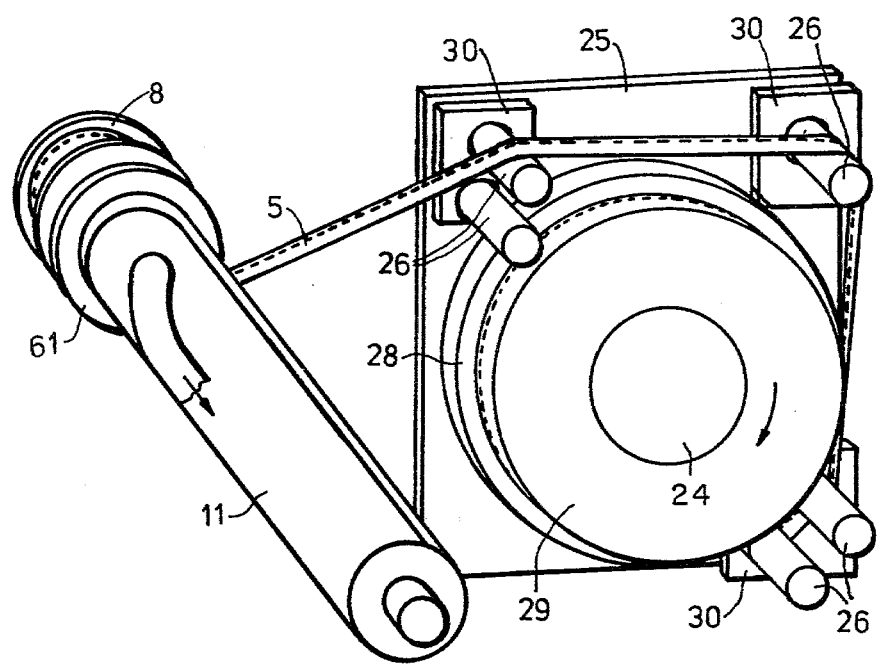
FIG. 9 is a pictorial view of a winding shaft with guide elements.

FIG. 9 also shows the guide elements 26 of the winding shaft 25 as shown in FIGS. 1 and 2. in the normal position after completing a maximum 360° rotation during the last turns. The strip of film 5 now has the same shape as the passage on the take-off side. The lever 11 has a holder 61 at the end thereof which holds the spool 8 which has previously been removed from a spool magazine 9 and joined to the strip of film 5 in known manner by notching impact (not shown).

Figure 10:
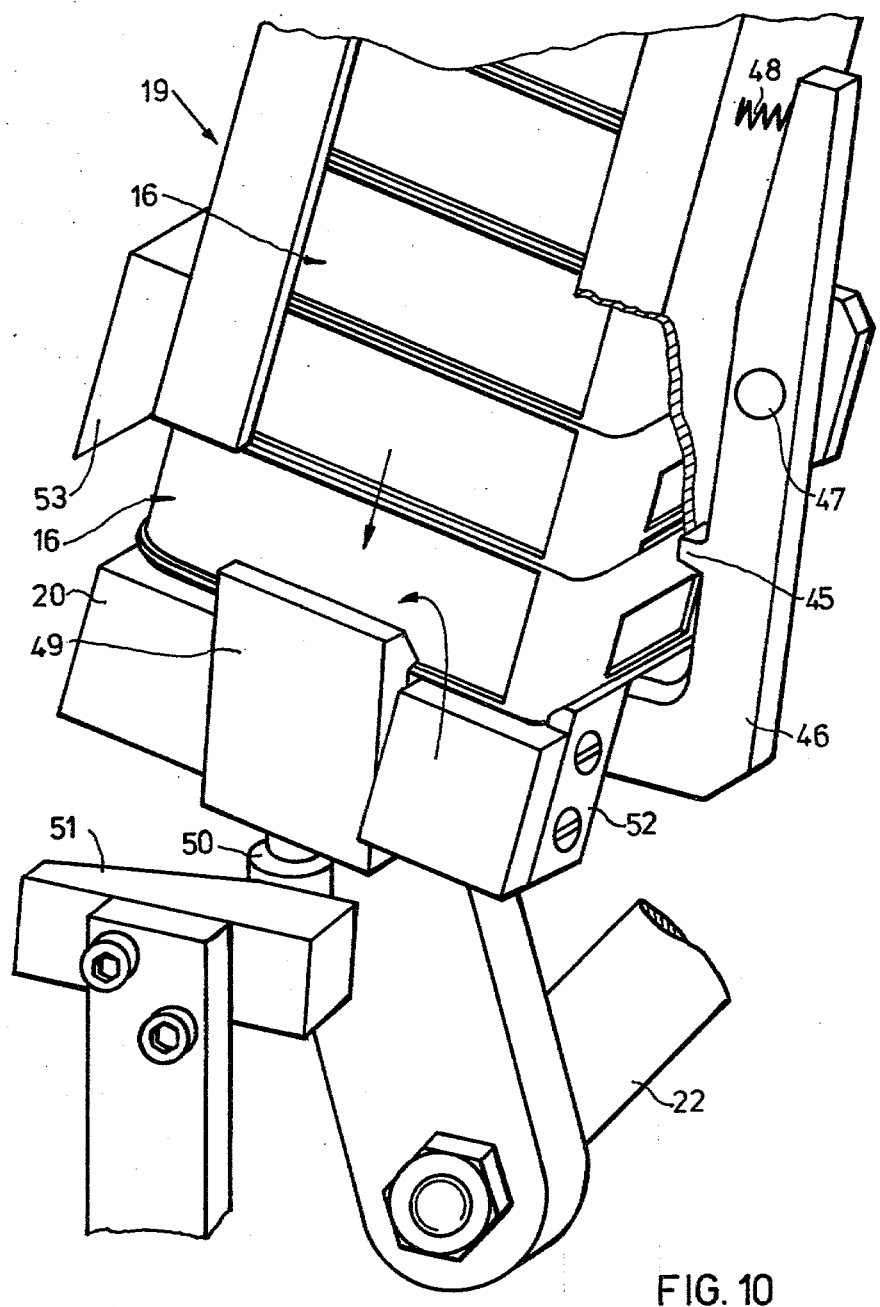
FIG. 10 is a pictorial view of removal of cassettes from a magazine.

FIG. 10 shows a cassette 16 being transferred from a cassette magazine 19. A cassette holder 20 which is pivotal about the shaft 22 is located beneath the magazine 19. A catch 45 which holds the contents of the magazine in the rest position is released by means of a lever 46 which pivots about a pivot 47 and is acted on by a spring 48, the lever 46 resting against cassette holder 20. An axially engaged clamping jaw 49 opened when a guide roller 50 runs along a cam rail 51. A stop 52 is located at the edge of the cassette holder 20 in the direction of rotation for fixing the cassette when the cassette holder 20 rotates about the shaft 22, with the aid of sliding movement produced by an approach rail 53.

Figure 11:
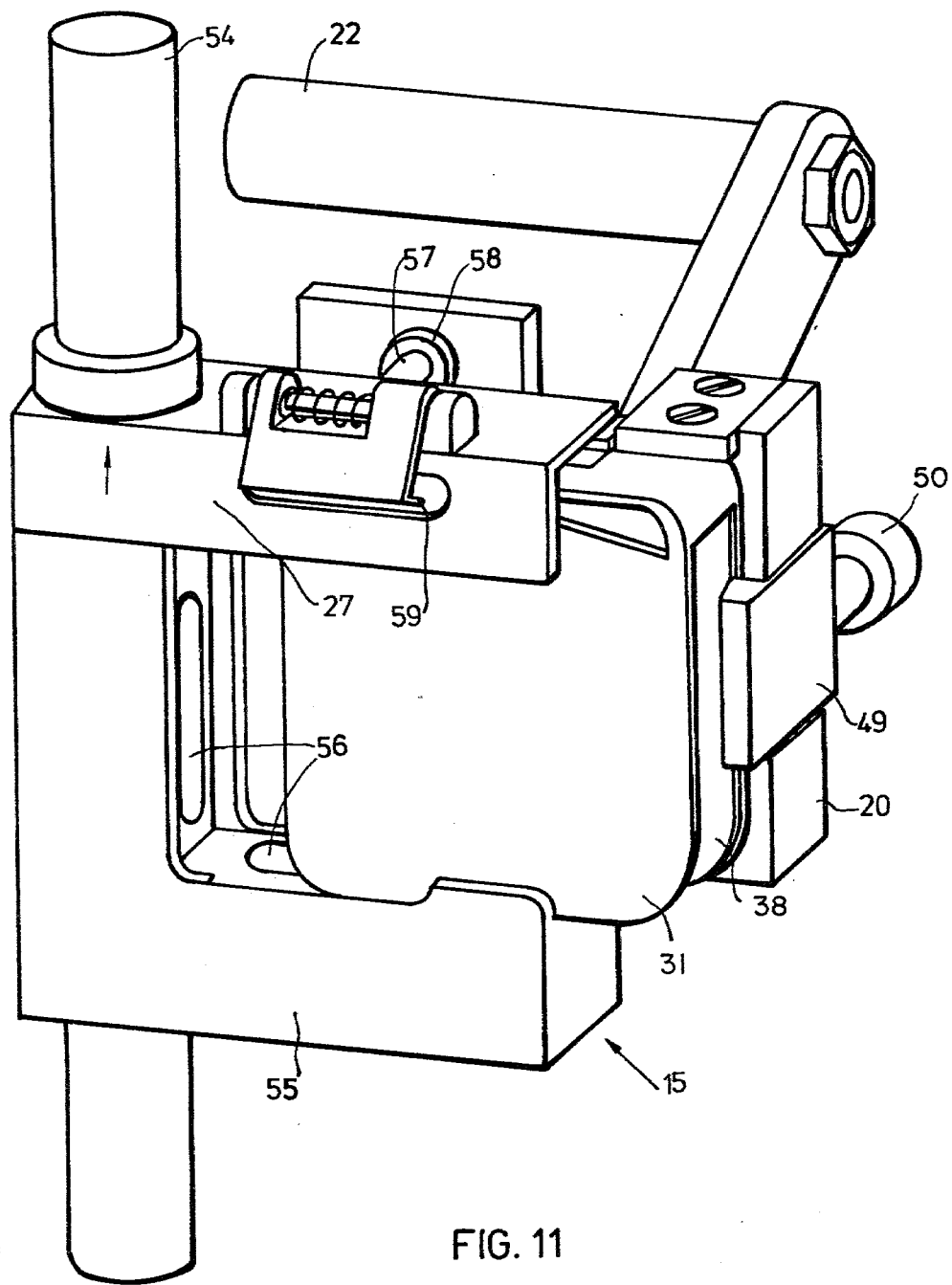
FIG. 11 is a pictorial view of transfer of cassettes to a positioning means.

FIG. 11 shows the cassette holder 20 pivoted about the shaft 22 into a position in which the cassette is vertically orientated during insertion into the positioning means 15. The positioning means 15 comprises an angled table 55 rotatable about a shaft 54 and having suction openings 56 and a hood 27 which may be moved upwards along the shaft 54. In order to remove the U-shaped cassette casing 31 from the cassette body 38 the hood 27 is provided with a spring-loaded claw 59 which is opened in the lowest position by a pin 57 on a stop 58. Moreover, there are cam rails (not shown) on the cassette holder 20 for opening the clamping jaw 49 in the end position of the cassette.

Figure 12:
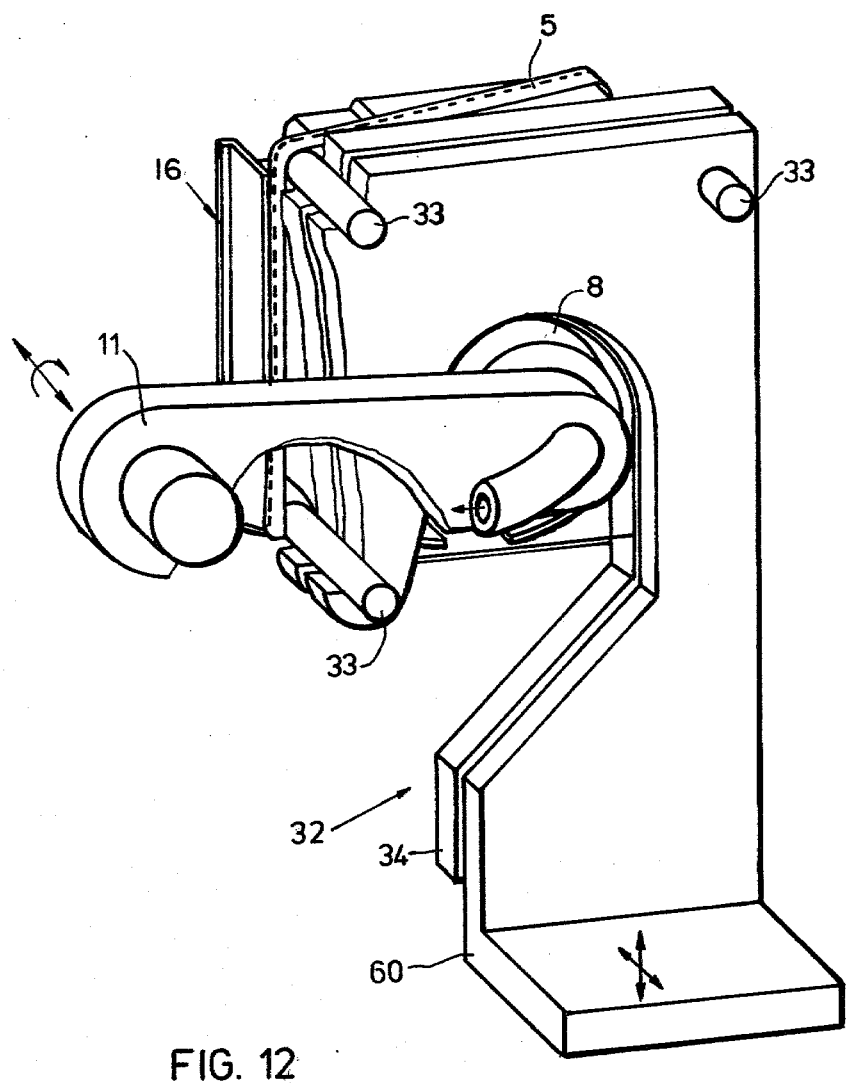
FIG. 12 is a pictorial view of a pusher in front of a cassette.

FIG. 12 shows a slide 32 which is initially movable from the bottom and then from the side against the vertically positioned cassette 16. The slide comprises a base plate 60 upon which the guide elements 33 are fixed, round which elements the strip of film 5 lies when the lever 11 moves axially and radially to insert the spool 8 into the cassette 16. A pusher 34 is arranged in front of the base plate 60 and may be moved against the cassette 16 for inserting the strip of film 5.

In use of the device, the beginning of a strip of film 5 is fed from the roll of film 1 via length compensator 2 by a draw off the drive 4 to the automatic winding unit 6 and wound into a roll 29 by the spindle 24, being deflected by a film guide. FIGS. 2, 8 and 9 illustrate the winding reel 25 with guide elements 26 is brought into operation during the last rotations so that the shape of the outer winding of the strip of film 5 corresponds to the shape of the passage on the take-off side. The strip of film 5 is simultaneously punched by a punch 3 over a predetermined measured length so that the remaining width fits exactly into the groove 35, FIG. 3 in the spool 8.

The spools 8 are conveyed into the magazine 9 by the vibratory sorting machine 7 and separated. A spool 8 is fed from the separator 10 to the punched out region of the strip of film, fixed to the strip of film by the spool applicator 12 and separated from the feed roll by the film cutter 13.

The empty cassettes 16 are located in the magazine 19 and prevented from falling out by the catch 45, FIG. 10, of the lever 46 which is pivotally mounted on the shaft 47 and urged backwards by the spring 48.

When the cassette holder 20 pivots upwards, the guide roller 50 runs against the cam rail 51 opens the spring loaded pivotal clamping jaw 49. The lever is pivoted against the action of the spring 48 by the cassette holder 20 just in front of the take-over position. The stack of cassettes slides downwards when the catch 45 recedes so that the lowest cassette 16 comes to rest flat on the cassette holder 20.

When the cassette holder 20 is rotated in the opposite direction, the lever 46 which recedes as a result of the force of the spring 48 secures the stack in the magazine 19 from the second cassette 16 upwards, by means of the catch 45. The cassette 16 lying on the cassette holder 20 is positioned by sliding on the approach rail 53 and is then pushed against stop 52. The cassette is thus gradually restrained by the spring-mounted clamping jaws 49 when the guiding roller 50 runs on the cam rail 51.

The cassette holder 20 pivots in the vertical direction and pushes the upright cassette 16 laterally into the positioning means 15, FIG. 11. The cassette 16 is fixed by applying a vacuum to the openings 56 of the angled table 55.

Through the stop 58, the pin 57 releases the spring-loaded claw 59 which is arranged in the upper removal hood 27 so that it can engage in the recesses in the cassette casing 31. The removal hood 27 rises up the shaft 54, taking with it the cassette casing 31.

The positioning means 15 pivots in front of the guide and centering elements 26 of the winding shaft against which the slide 32, FIG. 12 with guide and centering elements 33 travels passing to the take-up side of the cassette 16.

The spool 8 is fixed on the lever 11 on the closed side of the hub by suction and the free end of the strip of film is then guided by rotation and by axial travel successively around the guide element and centering elements 33 until the spool 8 applied to the end of the strip of film 5 is placed on the take-up pin 14.

The pushers 30 and 34 arranged on both sides of the positioning means 15 as well as the pushing member 28 push the free strip of film into the passages and push the roll into the chamber.

The removal hood 27 with the cassette casing 31 then travels over the cassette body 38 again so that one of the arms slides downwards on the bevel 70, FIG. 8 of the central pushing member 28.

The cassette holder 20 again takes over the loaded cassette 16 from the positioning means 15 and delivers it to the stacking unit 21.

We claim:

1. A device for loading film into film cassettes such as motion picture camera cassettes and particularly cassettes having a film take up spool positioned on a side of the cassette opposite a center partition from a rolled film supply, the device comprising a feed roll for supplying the length of one film, a mechanism for metering the length of one film, a winding unit with an automatic winding means for producing a spool-less roll of film, a spool unit for applying a spool taken from a first magazine to a free end of the film of the roll, a second magazine for advancing empty cassettes having film guiding passages to the loading device, a loading device for loading the cassettes with the film and the spool and a stacking unit for cassettes containing film and spool, wherein the loading device comprises (a) a winding reel in the automatic winding means for producing the spool-less roll of film, coupling means for connecting the winding reel to the spindle for rotating the winding reel one time around the spindle during formation of the last turn of the spool-less roll of film, guide elements being mounted on the winding reel about its periphery for causing the strip of film to conform to the guiding passages on a side of the cassette into which the film roll is inserted;

(b) a positioning means which is movable against the spindle and is provided for receiving the cassette with a broadside having an interior wall which has the form of the rolled film strip and is provided for receiving the cassette fixed in an upright position and is equipped with a moveable hood which may be raised for removing a cassette casing;

(c) a slide which is slidable against the positioning means upon which guide elements are arranged for causing the shape of the strip of film to conform to that of a guiding passage on a take-up side of an opened cassette;

(d) an axially and tangentially movable lever having on one end a holder for a spool joined to the strip of film which lever moves the spool and the joined film strip from a joining position to a take-up position of the cassette whereby the film strip is wound around the guide elements on the winding reel, said guide elements having the form of an inner side of the cassette in which the spool take-up spindle is positioned; and (e) a central pushing member provided with a bevel at its top for pushing the roll of film from the spindle and along the guide elements for inserting the strip of the film into the guiding passages.

2. A device according to claim 1, wherein the guide elements are in the form of rollers.

* * * * *